UNITED STATES PATENT OFFICE 2,397,802

INSECTICIDAL COMPOUNDS AND A PROCESS OF MAKING SAME

Paul Müller, Basel, Switzerland, assignor to the firm J. R. Geigy A. G., Basel, Switzerland No Drawing. Application February 18, 1944, Serial No. 522,963. In Switzerland March 5, 1943

10 Claims. (Cl. 260—645)

I have found that condensation products of the general formula

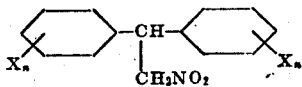

wherein X means hydrogen, halogen or methyl and $n$ stands for one of the integers 1 and 2, are extremely suitable for use as pest combating agents, especially for annihilating insects of all kinds as well as their developing stages.

The preparation of the new products is carried out by condensation of aryl nitroethanol or nitroacetaldehydes respectively or of compounds reacting in the same manner as the said products with corresponding benzene derivatives in the presence of known condensation agents, like sulfuric acid, aluminium chloride, zinc chloride etc.; more precise explanations with respect to the preparation of the new products are given in the following examples.

The combating of pests may be carried out in the usual manner, for instance in form of solutions, emulsions, strew powders as well as in form of mixtures with other insecticides and so forth.

The present invention may now be illustrated, but not limited, by the following examples, wherein the parts are by weight, unless otherwise stated.

Example 1

By causing a sodium methylate solution obtainable from 3.5 parts of sodium and 70 parts by volume of methyl alcohol to react with a solution cooled to below 0° C. of 21 parts of p-chlorobenzaldehyde and of 10 parts of nitromethane in 120 parts by volume of ethyl alcohol, the sodium salt of the p-chlorophenyl nitroethanol is obtained in form of a white powder, which is filtered by suction, washed with ether and dried for a short time in air. Now, the product is dissolved in cold water, the turbid solution is treated with such a quantity of diluted acetic acid that it just reacts slightly acid and the separated oil is extracted with ether. After distillation of the solvent one obtains in form of an oil the p-chlorophenyl-2-nitroethanol of the formula

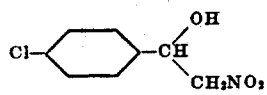

16 parts of this compound are mixed with 20 parts of chlorobenzene and the mixture is allowed to drop into 50 parts by volume of monohydrate, while cooling with ice and thoroughly stirring. Stirring is continued for further 3 to 4 hours at room temperature, then the mixture is poured onto ice and extracted with ether, whereupon the volatile constituents, among which is for example p-chloro-ω-nitrostyrol, are removed by means of steam, then the residue is again extracted with ether. The ethereal layer is washed with sodium bicarbonate, dried and distilled in high-vacuo. The 1:1-di-p-chlorophenyl-2-nitroethane distils only with difficulty at 0.5 mm. pressure and at 175°–180° C.; it is obtained in form of a thick oil becoming solid after some standing. When recrystallised from petroleum ether and a little ether it melts at 62° C. The compound which has the following formula

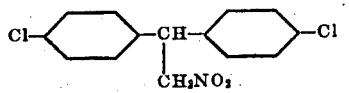

possesses strong insecticidal properties.

In an analogous manner 1:1-ditolyl-2-nitroethane, B. P. at 0.3 mm. pressure=169°–170° C., and 1:1-di-o-xylyl-2-nitroethane, B. P. at 0.4 mm. pressure=177°–179° C. are obtained.

Example 2

A mixture of 20 parts of chlorobenzene and 16 parts of 1-phenyl-2-nitroethanol, which may be obtained according to the process indicated in Example 1, from benzaldehyde and nitromethane by addition of sodium methylate, is caused to drop with good cooling into 50 parts by volume of monohydrate. After a stirring for 2 to 4 hours at room temperature the mixture is poured onto ice. The working up takes place as described in Example 1. Thus 1-phenyl-1-p-chlorophenyl-2-nitroethane boiling at 0.5 mm. pressure at 167° C. is obtained in form of a yellowish, thick oil. It shows also strong insecticidal properties.

In an analogous manner 1-tolyl-1-phenyl-2-nitroethane, 1-tolyl-1-chlorophenyl-2-nitroethane, 1-phenyl-1-xylyl-2-nitroethane, 1-tolyl-1-xylyl-2-nitroethane and the like may be produced.

For combating flies it is advantageous to spray a 5% alcoholic solution of 1:1-di-p-chlorophenyl-2-nitroethane.

By spraying also moths, plant lice and other pests are annihilated within a short time by the aforesaid compounds applied in solution. Instead of solutions in alcohol, petroleum or similar solvents, in many cases also aqueous emulsions are advantageously used. In contradistinction to the known insecticidal preparations the insecticidal effect of aqueous emulsions does not diminish even on long storage.

As food poison the said compounds are useful, when mixed either with inert substances or with other pests combating agents hitherto known.

*Example 3*

10 parts of nitroacetaldehyde diethyl acetal are mixed with 25 parts of toluene and gradually added to a mixture of 50 parts by volume of monohydrate and 25 parts of oleum 26% $SO_3$ cooled to −5° C. Stirring is continued over night at room temperature; then the mixture is poured onto ice and the reaction product extracted with ether. After having removed the volatile constituents by means of steam the residue is again extracted with ether and distilled in high-vacuo. Thus there results the 1:1-ditolyl-2-nitroethane which has already been produced in another way. Analogously other diaryl nitroethanes, which have partly already been described, can be prepared.

*Example 4*

485 parts of red bole are impregnated with a solution of 15 parts of 1:1-di-p-chlorophenyl-2-nitroethane in 300 parts of chloroform. The paste is dried in vacuo while stirring and then finely ground. Thus 500 parts of a pulverulent agent are obtained which may replace the rotenone preparations. To the powder may still be added wetting and adhesive agents.

*Example 5*

485 parts of magnesia usta (magnesium oxide) are impregnated with a solution of 15 parts of 1:1-ditolyl-2-nitroethane in 300 parts of alcohol. The obtained paste is dried and ground. Thus a pulverulent agent of good insecticidal efficacy is obtained.

*Example 6*

36 parts of 1:1-diphenyl-2-nitroethane are dissolved in 600 parts of acetic ester, whereupon 930 parts of bentonite are impregnated with this solution. The solvent is then removed in vacuo. Now, 60 parts of a powdery wetting agent, like an alkylated naphthalene sulfonic acid, and 24 parts of sodium carbonate are added and the whole is finely ground in a ball mill. Now, the powder is thoroughly mixed with a solution of 12 parts of gelatine and 12 parts of potassium chromate in 1200–1500 parts of water and the paste thus obtained is dried in vacuo and then finely ground. The powder yields, when suspended in water, a very good spray liquor, which adheres in an excellent manner and is poisonous for insects.

*Example 7*

850 parts of calcium carbonate and 100 parts of bentonite are impregnated with a solution of 50 parts of 1:1-di-p-bromo-phenyl-2-nitroethane in 450 parts of alcohol and the mixture is dried in vacuo while stirring well. The dried powder is mixed with 50 parts of caseine, 22 parts of sodium carbonate and with 30 parts of a solid wetting agent, such as for instance of a fatty alcohol sulfonate, and finely ground.

The finished mixture gives, when suspended in water, a well adhering and well wetting spray liquor reacting on insects as food poison and also as contact poison.

*Example 8*

15 parts of 4:4'-dimethyl-1:1-diphenyl-2-nitroethane are dissolved in a mixture of 30 parts of toluene and 15 parts of methyl hexaline, whereupon 40 parts of soft soap are added. Then the mixture is heated until it is clearly dissolved. 1% to 2% solutions of this mother-emulsion kill insects after a short time on bespattering.

*Example 9*

12.5 parts of 1-(2':6'-dichlorophenyl)-1-(4''-chlorophenyl)-2-nitroethane are dissolved in a mixture of 25 parts of toluene and 12.5 parts of methyl hexaline and added to 10 parts of a quaternary wetting agent having for instance the following formula:

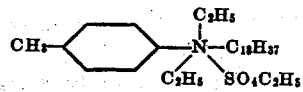

After a thorough stirring one obtains a dark solution which may be diluted with water in any proportion. The diluted solutions are milky and kill insects even in a slight concentration. Of course, the solution of the active substance may also be added to a diluted solution of the quaternary wetting agent, whereupon the whole is stirred.

*Example 10*

25 parts of 1:1-di-p-bromophenyl-2-nitroethane are dissolved in a mixture of 50 parts of toluene and 25 parts of methyl hexaline and introduced, while thoroughly stirring, into a solution of 100 parts of fatty alcohol sulfonate in 200 parts of water, the latter solution having been prepared in the heat. On addition of water the viscous mass becoming solid in the cold produces a milky emulsion which, even in a very large dilution, possesses strong insecticidal properties. In an analogous manner emulsions with isopropyl naphthalene sulfonic acids or with other wetting agents may be produced.

*Example 11*

12.5 parts of 1:1-diphenyl-2-nitroethane are dissolved in a mixture of 25 parts of toluene and 12.5 parts of methyl hexaline and added, while stirring thoroughly, to 500 parts of a 10% solution of sodium alginate. A thick milky turbid mass is obtained which may be diluted with water thus giving a milky emulsion. Instead of alginic acid also glue, caseine or albumin decomposition products in suitable concentrations may be used. Of course, also mixtures of wetting and emulsifying agents may be used in any combination.

What I claim is:

1. A process for the manufacture of the compounds of the general formula

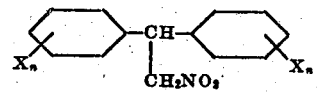

wherein X stands for a member selected from the group consisting of H, $CH_3$ and halogen, and $n$ stands for one of the integers 1 and 2, which comprises condensing a compound of the formula

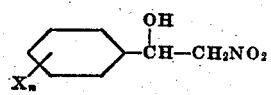

with a compound of the formula

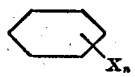

X and $n$ having in the last two formulae the meanings above set forth.

2. A process for the manufacture of the compounds of the general formula

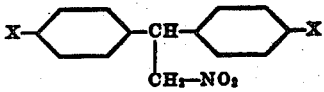

wherein X stands for a member selected from the group consisting of H, $CH_3$ and halogen, which comprises condensing a compound of the formula

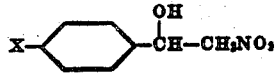

with a compound of the formula

X in the last two formulae having the meaning above set forth.

3. A process for the manufacture of the compounds of the general formula

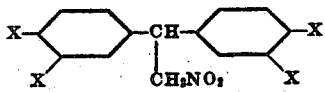

wherein X stands for a member selected from the group consisting of H, $CH_3$ and halogen, which comprises condensing a compound of the formula

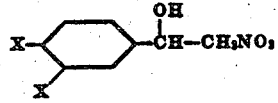

with a compound of the formula

X in the last two formulae having the meaning above set forth.

4. A process for the manufacture of the compound of the formula

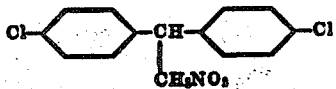

which comprises condensing chlorobenzene with α-(p-chlorophenyl)-β-nitroethanol.

5. A process for the manufacture of the compound of the formula

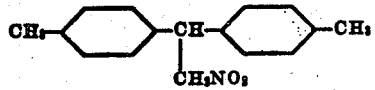

which comprises condensing toluene with α-(p-methylphenyl)-β-nitroethanol.

6. A process for the manufacture of the compound of the formula

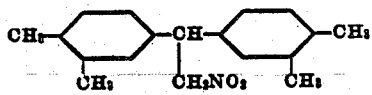

which comprises condensing o-xylene with α-(xylyl)-β-nitroethanol.

7. The compounds of the general formula

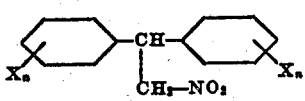

wherein X stands for a member selected from the group consisting of H, $CH_3$ and halogen, and $n$ stands for one of the integers 1 and 2.

8. The compound of the formula

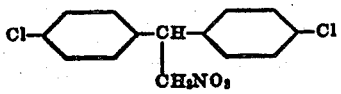

being a solid having the melting point of 62° C.

9. The compound of the formula

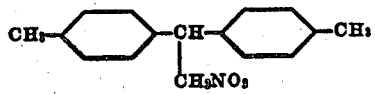

being a thick oil of the boiling point of 169°–170° C. at 0.3 mm. pressure.

10. The compound of the formula

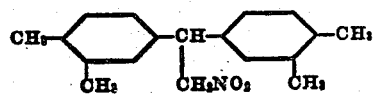

being a thick oil of the boiling point of 177°–179° C. at 0.4 mm. pressure.

PAUL MÜLLER.